United States Patent [19]
Robison

[11] 4,287,721
[45] Sep. 8, 1981

[54] CHEMICAL HEAT PUMP AND METHOD

[76] Inventor: Harry I. Robison, 2916 Midway Loop, Pawleys Island, S.C. 29585

[21] Appl. No.: 47,356

[22] Filed: Jun. 11, 1979

[51] Int. Cl.³ .............................................. F25D 17/06
[52] U.S. Cl. ........................................ 62/94; 62/271; 165/60
[58] Field of Search ................ 62/91, 92, 93, 94, 271; 165/60

[56] References Cited

U.S. PATENT DOCUMENTS

| | | | |
|---|---|---|---|
| 2,017,027 | 10/1935 | Forrest | 62/93 |
| 2,114,787 | 4/1938 | Smith | 62/94 |
| 2,147,248 | 2/1939 | Fleisher | 62/94 |
| 2,276,970 | 3/1942 | Hibberd | 165/60 |
| 2,894,376 | 7/1959 | Kelley | 62/94 |
| 3,415,313 | 12/1968 | Olstad | 62/93 |

*Primary Examiner*—Ronald C. Capossela
*Attorney, Agent, or Firm*—Miller & Prestia

[57] ABSTRACT

A concentrated saline solution is used to store solar energy for both heating and cooling. A small, uninsulated tank is used to store the desiccant solution so that the heat pump can operate at night or during extended periods when the sun is obscured. No vacuum or pressure refrigerant systems are needed. Reconcentration of the sorbent solution is accomplished by direct solar radiation.

14 Claims, 4 Drawing Figures

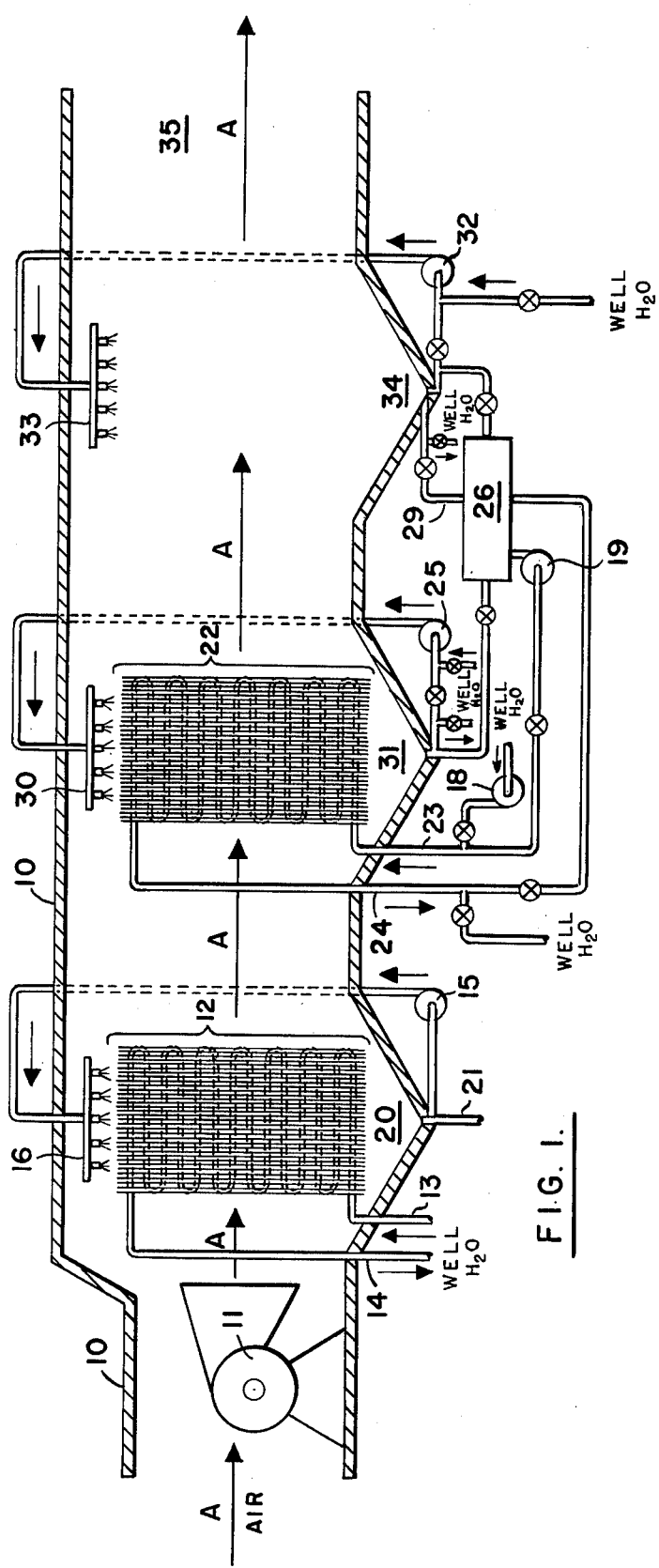

CHEMICAL HEAT PUMP AND METHOD

This invention relates to a novel apparatus and method for alternatively cooling or heating a gaseous medium such as air, for example, utilizing the novel principle of a chemical heat pump.

DISCUSSION OF THE PRIOR ART

Open cycle air conditioning systems using liquid desiccants as absorbers and employing solar energy to regenerate the desiccant solutions have been described by a number of scientists, and operational data on a liquid sorbent system are available. Methods to improve the performance of these systems have been suggested by several investigators. However, existing systems have been lacking in efficiency for alternative heating and cooling, and have had other major disadvantages.

Chemical heat pump development work is under way at several laboratories around the world. Representative work has been reported at Hiller, C.C., "The Chemical Heat Pump/Chemical Energy Storage System for Solar Heating and Cooling", Chemical Heat Pump/Energy Storage Technology Workshop, Livermore, California (1978) and Offenhartz, P.O'D., "Chemically Driven Heat Pumps for Solar Thermal Storage", *Sun: Mankind's Future Source of Energy. Proceedings of International Solar Energy Society Congress, New Delhi, India*, de Winter, F., and Cox, M., eds, Pergamon Press, Elmsford, New York (1978). However, the systems described in these references all operate as closed cycles and require vacuum or pressure systems.

BRIEF DESCRIPTION OF THIS INVENTION

In accordance with this invention, advantage is taken of the fact that liquid desiccant cooling systems have a unique characteristic: the ability to store energy as a concentrated chemical solution. Concentrated solutions can be said to have a higher potential energy than dilute solutions. It is this "concentration difference energy" that makes possible large energy stores in small uninsulated tanks maintained at ambient temperature. This storage capability of liquid desiccant air conditioning and heating systems has led to the discovery of a chemical heat pump which uses thermo-chemical energy storage for both heating and cooling.

The apparatus and method of this invention utilize an open cycle, chemical heat pump using water as the refrigerant, salt solution as the dessicant or absorber, and air as the transfer medium. A small uninsulated tank is used to store the concentrated desiccant (salt) solution so that when solar heat is used to concentrate the desiccant, the heat pump can operate at night or during extended periods when the sun is obscured. Simple tube-in-tube heat exchangers may be used to recover sensible heat absorbed by the desiccant.

For purposes of cooling the air, the apparatus of this invention uses a salt solution to cool the air by pumping heat from warm air and discharging it into shallow-well water. For purposes of heating, the chemical heat pump heats the air by pumping heat from the well water and transferring it into the cool air.

This pumping action requires no power-consuming compressor. As water evaporates into the air, the temperature of the air decreases. Conversely, as water vapor is removed from the air, the temperature of the air increases. A salt solution absorbs the water vapor from the air. During the cooling cycle, cooling by evaporation takes place in the warm air and heating by absorption takes place in contact with the well water; heat is pumped into the well water. During the heating cycle, heating by absorption takes place in the cool air and cooling by evaporation takes place in contact with the well water; heat is pumped from the well water.

OF THE DRAWINGS

FIG. 1 is a schematic view showing one form of apparatus in accordance with this invention, illustrating the method in which a medium such as air may be alternatively heated or cooled in accordance with one embodiment of this invention;

FIG. 2 is a schematic block diagram showing a preferred sequence of method steps for the cooling cycle in accordance with this invention;

Figure 4:
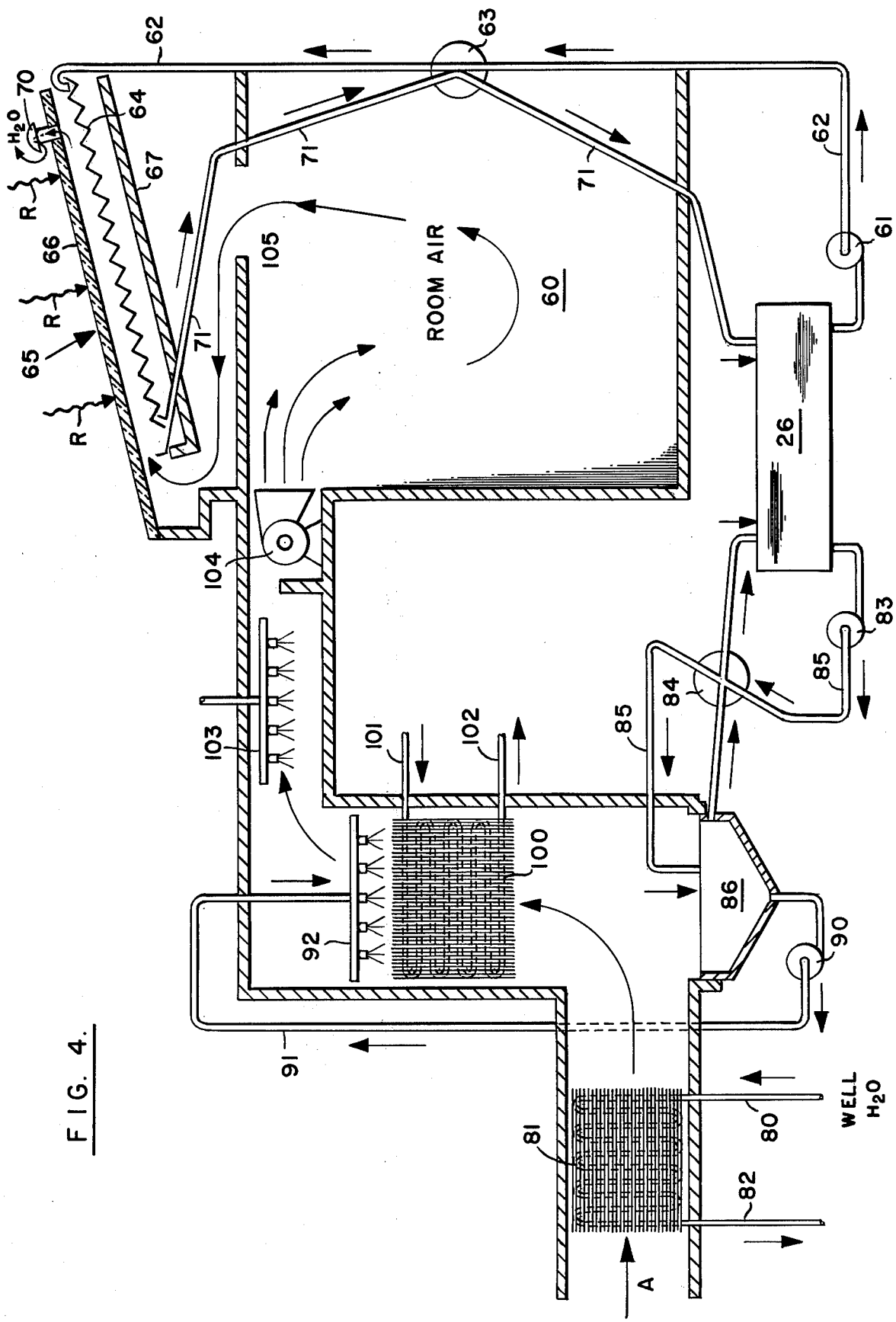

FIG. 3 is a block diagram similar to FIG. 2, showing a preferred sequence of method steps for the heating cycle in accordance with this invention, and FIG. 4 is a diagrammatic view illustrating an arrangement of components in accordance with one embodiment of this invention, particularly illustrating one preferred manner for connecting the chemical into a combined treatment and chemical regeneration arrangement.

The following description of the specific embodiments of this invention illustrated in the drawings is not intended to limit the scope of the invention. In this portion of the description specific words will be used in the interest of clarity, but it will be appreciated that many modifications may be made without departing from the spirit and scope of the invention as defined in the appended claims.

Referring now to FIG. 1, the number 10 designates duct work into which the medium to be treated, such as air, is introduced. The arrows A indicate the direction of movement of this medium, hereinafter described as air.

The number 11 designates a blower arranged to conduct the air through and out of the treating apparatus in accordance with this invention. The blower 11 may be energized in any conventional manner, preferably by use of an electric motor.

The number 12 designates heat transfer coils having an inlet pipe 13 and an outlet pipe 14. The inlet pipe 13 is connected to a supply of well water, which in many places in the United States and elsewhere occurs at a temperature in the range of about 60°–70° F. In many areas a large supply of such well water exists, and its effective utilization is an important aspect of this invention. The water may be pumped by means of a conventional electrically energized pump (not shown) in line 13, and the water emanating from the heat exchanging coils 12 may be delivered back to the well through the line 14, with or without a pump, as desired.

The number 15 designates a pump connected to deliver water to a spray head 16, located above the heat exchanging coils 12 and arranged to provide sprays or showers of water during the heating cycle upon these coils. During the cooling cycle the spray head 16 is not used. Directly beneath the spray head 16, the duct 10 is provided with a sump 20 provided with a drain 21.

Downstream of the heat exchanger coils 12, in the duct 10, is another set of heat exchange coils 22, also connected to the well water through the pipes 23, 24, in a manner similar to pipes 13 and 14 previously described herein. The well water is provided by pump 18 in performance of the cooling cycle. The pump 25 is connected to a tank 26 containing a concentrated saline solution, such as a solution of calcium chloride, for example. This solution is used for drying the air in performance of the cooling cycle.

Although various other desiccant chemicals may be utilized other than calcium chloride, reference will hereinafter be made to calcium chloride in this description, in the interest of brevity.

The calcium chloride pump 25 is connected to a spray head 30 located directly above the heat exchanger coils 22. A sump 31 is provided directly beneath the spray head 30.

Downstream of the desiccant spray head 30 is another pump 32 connected to a spray head 33, directly located above a sump 34. During performance of the cooling cycle, spray head 33 is provided with well water by way of pump 32, using the well water inlet pipe, and with the container 26 isolated from pump 32. An exit 35 is provided for the air thus treated in accordance with this invention.

In the operation of the heating cycle, the container 26 is connected through pump 19 to pipe line 23, and the valves on return line 24 are so adjusted that the saline solution flowing through the heat exchanger tubes 22 returns to the container 26. Similarly, the valves at pump 25 are so adjusted that well water is introduced through pump 25 and through the spray heads 30. The well water return line valves are so adjusted that the well water is returned to the well, or elsewhere.

Similarly during the heating cycle, the valves at pump 32 are adjusted so that the well water is isolated from the pump 32, whereupon the pump 32 conducts the saline solution to the spray heads 33, and the saline solution is returned to the container through the pipe line 29. Heat of condensation of condensing water of humidity heats the air as it is being dried and the product is a warm, dry air.

FIG. 2 shows the cycle which is utilized for the purpose of cooling air. The block 40 in FIG. 2 represents the hot humid outside air being introduced by the blower 11, while the block 41 designates the cool inlet air resulting from contact with the heat exchanger coils 12. The block 42 designates the cool dry air produced as a result of combined treatment by the desiccant spray head 30 and the cooling coils 22. The block 43 designates the somewhat humidified cold air resulting from treatment by the spray head 33.

FIG. 3 of the drawings illustrates the utilization of the apparatus in a heating cycle, utilizing novel features in accordance with this invention. The block 50 designates the cool air introduced into the system by the blower 11, and the block 51 designates the cool humidified air which has been humidified pursuant to treatment by the spray heads 16 and the heat exchanger coils 12. The block 52 designates the warm humid air resulting from the introduction of warm liquid into the heat exchanger coils 22, instead of well water as heretofore discussed in connection with air cooling. This heating of the air is effected in conjunction with water spray heads 30, which humidify the air resulting in the production of warm, humid air. The block 53 designates the hot, dried air resulting from treatment by the calcium chloride desiccant solution in the spray heads 33. The air thus heated and conditioned is ideally suitable for use in residential or other heating.

Accordingly, it will be appreciated that the invention is adapted for either cooling or heating air. In the cooling cycle, the hot humid outside air is passed over cooling coils 12 through which flows cool well water. The cooled humid air is then subjected to a concentrated spray 30 of calcium chloride, which condenses water from the air and the resulting heat of condensation is removed simultaneously by a second well water coil 22. The cool, dry air is subjected to a water spray 33, which further reduces the temperature of the air as the humidity increases. The conditioned air is then introduced into the dwelling unit at a temperature lower than the temperature of the well water.

In the operation of the heating cycle, room air at about 67° F. (for example) and about 30% relative humidity is subjected to a water spray 16. The heat of vaporization is furnished by coils 12 through which flows cool well water, resulting in the processed air having increased humidity but only slightly lowered temperature. The processed air is then heated with warm liquid at 22, sprayed with water at 30 to produce warm humid air, and is then subjected to a spray of calcium chloride at 33, which removes water from the air by condensation, and the heat of condensation increases the air temperature. Thus, the temperature of the processed air delivered for use is much higher than the temperature of the well water.

Operation in either the heating or cooling cycle results in dilution of the calcium chloride solution. Reconcentration is accomplished by evaporation using any means, such as solar energy or normal evaporation procedures using low temperature waste heat, heat furnished by off-peak electricity, electricity generated by wind power, or any other convenient source.

The invention is not limited to the use of calcium chloride. Other desiccants such as lithium chloride, lithium bromide and others may also be used.

A small uninsulated tank may be used to store energy in the form of a concentrated desiccant solution with energy density of about 2,500 BTU/gal. of desiccant.

An example of the manner in which desiccant reconcentration may be combined with the cooling process of this invention appears in diagrammatic form in FIG. 4 of the drawings. The number 60 designates a room or other area to which the heated or cooled air is desired to be delivered. The storage container 26 is connected by pump 61 through pipe 62 and heat exchanger 63 onto the surface of a heat exchange element 64 which comprises a portion of a solar heater 65. The rays R of the sun impinge upon the heat absorption surface 66 of solar heater 65, evaporating water from the calcium chloride solution. Alternatively, the solution may be exposed directly to the sun, and may be dyed a dark color to improve its heat absorption. The water vapor is returned to the atmosphere through one or a series of vents 70. The concentrated calcium chloride solution is returned by way of line 71 and heat exchanger 63 to the storage tank 26.

As shown in FIG. 4, cooling water may be supplied through the pipe 80 to the cooling coils 81 and returned to the well through the pipe 82. Calcium chloride solution may be provided from the storage tank 26 through pump 83 and heat exchanger 84 through pipeline 85 to the sump 86, and from the sump 86 through pump 90 and line 91 through spray head 92, thus treating and drying the flowing air by direct contact with calcium chloride solution, which then returns by gravity to the sump 86.

The number 100 designates cooling coils provided with a cooling water inlet pipe 101, and with a cooling water exit pipe 102.

Downstream of the spray head 92 is another spray head 103 for further air treatment. The number 104 designates a blower for conducting the air through the system and into the room 60. Room 60 is provided with a vent space 105 through which exhaust air is caused to flow, in the direction indicated by the arrows, over the solar heater 65 where it combines with the evaporated water and passes out through the vent 70.

In the cooling cycle of FIG. 4, incoming air is cooled by the coils 81 and is dried by the spray 92, with accompanying cooling by the coils 100. Re-humidification under controlled conditions takes place with the use of well water at spray 103.

In the heating cycle in accordance with FIG. 4, the cool return air is humidified at 81, preferably with the utilization of a spray head similar to that heretofore discussed in connection with FIG. 1, and is then heated with the utilization of the heat exchanger 100, utilizing warm fluid at 101. This may be done in conjunction with the spray 92, connected in the manner heretofore discussed in connection with the spray 30. The warm, humid air thus resulting may be treated with the utilization of calcium chloride solution in the manner heretofore discussed in connection with the spray 33, utilizing spray 103. Although certain of the pipes and connections utilized in connection with the heating cycle have been omitted from FIG. 4 in the interest of clarity, it will be appreciated that appropriate pipes, pumps, valves and other fittings may be utilized in FIG. 4 in the same manner as previously discussed in connection with FIG. 1.

Accordingly, heating by absorption takes place in the room 60, and cooling by evaporation takes place in contact with the well water. Consequently, heat is pumped into the room 60 from the well water. Preferably, the inside air is humidified by well water at about 60°-70°, more preferably about 64° F., which furnishes the heat of vaporization. The enthalpy of the process air increases even though its dry bulb temperature is slightly reduced. Additional latent and sensible heat are added by passing the air across a second water-sprayed coil through which the warm chemical solution is pumped from storage. Although the temperature of the chemical solution may vary, about 75° to 100° F. is a desirable temperature, 80° F. for example. Alternatively, energy may be supplied by other sources of waste heat as convenient. Dehumidification of the warm, wet air with the utilization of the calcium chloride solution produces a final conditioned air temperature of about 100° to 120° F., a typical temperature being about 105° F.

As will now be understood, the operation of this process in either the heating or cooling cycle results in dilution of the chemical solution by absorption of water. For reuse of the chemical solution, reconcentration is required. Although the apparatus illustrated in FIG. 4 comprises one form of apparatus for accomplishing reconcentration, this may be done in a variety of other ways.

It will also be understood that when the apparatus is operating in the cooling cycle, air from the room 60 is continuously exhausted into the vent area thereabove, allowing the regeneration air stream to pick up sensible heat. The hot, dry air flows up between the solar heater 65 and the exposed roof surface 66. The result is that the sorbent solution is reconcentrated and that the wet regeneration air is exhausted to the atmosphere.

During the heating mode, the hot humid air from the vent 70 may be returned to the room 60, resulting in complete recovery of both sensible and latent heat.

It is surprising in accordance with this invention that the size of the storage tank 26 may be very modest. For example, in one installation the storage capacity for diurnal cooling may be less than 11 gallons per ton-hour. This small capacity is made possible by the utilization of the fact that the maximum cooling load occurs only a few hours later than the period of maximum solation. However, for heat for heating, a somewhat larger storage capacity is desirable.

As a specific example, an apparatus is provided having a collector regenerator area of 200 square feet, and is provided with a solution flow rate through the collector-regenerator of 9 pounds per minute. This results in a conditioned air flow rate of 40 pounds per minute, and a cooling capacity of approximately two tons per hour with a cooling coefficient of performance of 0.7. The latent heat gain of the air flowing through the collector-regenerator is about 2.5 times the sensible heat gain. When the pump is operating from storage, over 40% of the enthalpy gained by the conditioned air results from contact with the well water. Therefore, the overall heating coefficient of performance is greater than 1. In such an installation it is recommended to provide a capacity for storage tank 26 of about 50 gallons per "ton" of heating.

Although this invention has been described with reference to specific forms thereof, it will be appreciated that a variety of modifications may be made without departing from the spirit of the invention. For example, parts may be reversed, sequence of method steps may be reversed, certain features may be used independently of the use of other features, and various equivalent elements may be substituted for those specifically shown and described. All such modifications may be made without departing from the spirit and scope of this invention which is defined in the appended claims.

I claim:

1. In an apparatus for heating or cooling air wherein means are provided for forming an air conduit and for conducting air through said conduit for effecting said heating or cooling, the combination which comprises:
   (a) means in said conduit for spraying said air with water,
   (b) means also in said conduit for spraying said air with a hygroscopic liquid under conditions effective to extract humidity from said air,
   (c) means for separating water from said hygroscopic liquid to concentrate the same, and
   (d) means for re-using the concentrated hygroscopic liquid.

2. The apparatus defined in claim 1 further characterized by the provision of storage means connected to receive said hygroscopic liquid from said spraying means (b) and to deliver said hygroscopic liquid to said separating means (c).

3. The apparatus defined in claim 2 further characterized by the provision of means connecting said storage means to receive concentrated hygroscopic liquid from said separating means (c).

4. The apparatus defined in claim 2 further characterized by the provision of means connecting said storage means to receive diluted hygroscopic liquid from said spraying means (b).

5. In a chemical heat exchanging method of storing energy for alternate heating and cooling of air, the steps which comprise:
  (a) while cooling warm humid air; spraying a saline solution through said warm humid air thereby condensing water from said air and diluting said solution,
  (b) while heating cool dry air: humidifying said dry air and thereafter spraying a saline solution through said humidified air thereby adding heat of condensation to said air and concurrently diluting said saline solution,
  (c) evaporating water from said diluted solution from either step (a) or step (b) to produce a more concentrated saline solution, and
  (d) re-using said more concentrated solution in either step (a) or step (b) hereof.

6. In a method of heating cool air, the steps which comprise:
  (a) humidifying the cool air and heating said cool air,
  (b) spraying the heated humidified air with a hygroscopic solution under conditions effective to remove water therefrom, and thereby adding heat of condensation to said air and concurrently diluting said desiccant solution,
  (c) evaporating said removed water from said desiccant solution, and
  (d) re-using the desiccant solution for further removal of water from heated humidified air.

7. The method defined in claim 6, wherein the hygroscopic solution comprises calcium chloride.

8. The method defined in claim 6, further including the step of heating the cool air after the humidification step (a) has been completed.

9. In a method of storing energy and utilizing the energy thus stored, the steps which comprise:
  (a) providing a supply of a concentrated solution of hygroscopic solute in an aqueous solvent,
  (b) storing said solution;
  (c) utilizing stored energy from said solution by contacting it with humid air in a manner to condense water from said air thereby drying said air and heating said air with heat of condensation of said condensed water, thereby also diluting said hygroscopic solution and decreasing the amount of energy stored therein,
  (d) concentrating said diluted hygroscopic solution thereby replenishing the energy contained therein, and
  (e) returning said concentrated solution to storage.

10. The method defined in claim 9 applied for cooling air, further characterized by subjecting the heated, dried air to convection cooling.

11. The method defined in claim 10 wherein convection cooling is applied by transferring heat to cool well water.

12. The method defined in claim 10, further comprising the step of subjecting the dry convection cooled air to contact with a cool water spray, thereby further cooling the air while increasing its humidity.

13. The method defined in claim 9 applied for heating air, further characterized by the preliminary step of humidifying the incoming air.

14. The method defined in claim 9, wherein the concentration step (d) is accomplished by extracting energy from solar heat.

* * * * *